US008871321B2

(12) United States Patent
Ryan

(10) Patent No.: US 8,871,321 B2
(45) **Date of Patent: *Oct. 28, 2014**

(54) FLEXIBLE INLAY STRIPS AND METHOD OF MANUFACTURING THE SAME

(76) Inventor: Kevin Ryan, Westminster, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 13/457,004

(22) Filed: Apr. 26, 2012

(65) Prior Publication Data

US 2013/0078409 A1 Mar. 28, 2013

Related U.S. Application Data

(63) Continuation-in-part of application No. 13/245,458, filed on Sep. 26, 2011, now Pat. No. 8,440,042.

(51) Int. Cl.

| | |
|---|---|
| ***B32B 3/14*** | (2006.01) |
| ***B32B 9/00*** | (2006.01) |
| ***B32B 38/00*** | (2006.01) |
| ***B44C 1/26*** | (2006.01) |
| ***B44C 3/02*** | (2006.01) |

(52) U.S. Cl.

CPC .... *B44C 1/26* (2013.01); *B44C 3/02* (2013.01)
USPC .......... 428/55; 84/1; 84/173; 84/290; 84/291; 84/314 R; 428/53; 428/57; 428/58

(58) Field of Classification Search

USPC ........ 428/55, 53, 57, 58; 84/1, 173, 290, 291, 84/314 R
See application file for complete search history.

(56) References Cited

U.S. PATENT DOCUMENTS

| | | | | |
|---|---|---|---|---|
| 5,776,581 | A | 7/1998 | Sifel et al. | |
| 6,354,058 | B1 * | 3/2002 | Lewis | 52/749.11 |
| 8,053,053 | B1 | 11/2011 | Ryan | |
| 2001/0031336 | A1 * | 10/2001 | Born | 428/167 |

FOREIGN PATENT DOCUMENTS

| | | | |
|---|---|---|---|
| KR | WO 01/64455 | A1 | 9/2001 |

* cited by examiner

*Primary Examiner* — Brent O'Hern
(74) *Attorney, Agent, or Firm* — James M. Duncan, Esq.; Klein DeNatale Goldner

(57) ABSTRACT

A method of fabricating an ornamental purfling strip which has sufficient flexibility to be placed within a curved configuration. The ornamental purfling strips are sufficiently flexible to be placed, as a single unit, in curved channels which require the strip to bend. The flexibility results from a laminated structure comprising a layer of binding material overlain by an ornamental layer, with an adhesive or bonding agent attaching the layers together. The ornamental layer comprises a plurality of precisely placed breaks along its length. The binding material retains the individual fragments of the ornamental layer in the strip, but because the binding material comprises a flexible material, the layer of binding material is sufficiently flexible to allow the purfling strip to flex longitudinally and transversely. The ornamental layer may comprise organic shell material or synthetic materials such as synthetic opal.

20 Claims, 15 Drawing Sheets

FLEXIBLE INLAY STRIPS AND METHOD OF MANUFACTURING THE SAME

CROSS-REFERENCE TO RELATED APPLICATION

This is a Continuation-In-Part application of U.S. patent application Ser. No. 13/245,458 which was filed on Sep. 26, 2011, for which application this inventor claims domestic priority.

BACKGROUND OF THE INVENTION

The present invention generally relates to the construction of finely crafted wooden objects, such as musical instruments, cutlery and curios, in which the wooden object includes an inlay portion for ornamentation or functional purpose, such as inlay which forms an ornamental border adjacent to the outside edges of an instrument. An inlay is a material set within a depression or channel formed in a matrix material where, once installed, the top surface of the inlay is generally flush with the surface of the matrix material. Although many different materials may be utilized as the inlay material, organic shell materials such as abalone, oyster and snail have traditionally been utilized as the inlay material because of the lustrous and luminescent appearance of these materials. The specific material known for use with musical instruments, such as steel-string guitars, is abalone, a shell of the mollusk family, which has attractive patterns and can reflect many different colors. Pure shell material is often referred to slab. It is cut straight from the curved inside surface of the shell and then sanded flat to uniform thickness, such as 0.050". Because the pieces are cut from the curved surface of the shell, the pieces are often sawn into odd and irregular shaped pieces, referred to as "blanks".

As recognized in U.S. Pat. No. 5,776,581 (Sifel et al.), the use of these organic shell materials for inlay purposes is problematic because of the difficulty in obtaining shell pieces of sufficient thickness. Sifel discloses a organic shell inlay blank which may be utilized as a substitute for the shell fragments utilized by the prior art. Sifel's inlay blank comprises overlapping flexible layers of organic shell material with a bonding agent disposed between the layers. Sifel's blank is referred to by those skilled in the art as ABALAM or Ablam (hereinafter collectively referred to as ABALAM). This inlay material is made by laminating extremely thin sections of shell in such a way as to render the entire surface of the sheet with beautiful, figured shell patterns. Unlike natural shell slab pieces which have a varying surface area and depth, ABALAM is perfectly flat and easier to saw into delicate patterns because of the homogeneous nature of the laminations. ABALAM is frequently preferred when large pieces of inlay material are required.

When applied as inlay materials for musical instruments, ABALAM blanks are typically sawn or cut into thin strips of uniform width (usually about 0.040-0.060" wide). These strips may be utilized for a variety of purposes, including fashioning purfling and the rosette of the instrument. "Purfling" (sometimes spelled "perfling") is the term used for a decorative border. Purfling is commonly used in conjunction with the "binding", which is seated at the outermost corner of the instrument. The binding is fashioned from pieces of wood, plastic or fiber which are heated and then bent to fit around the curved edges of the instrument. The purflings are disposed between the binding and the adjacent edges formed by the top, sides, or back of the instrument. The binding serves to protect the edges of the instrument from impacts which might otherwise initiate a crack in the top of the instrument. In contrast, the purfling is purely decorative.

While materials having an organic origination are generally preferred as inlay materials, including ABALAM, various governmentally-imposed restrictions, such as under the U.S. Endangered Species Act (16 U.S.C. §§1531-1544, the "ESA"), the Lacey Act (16 U.S.C. §§3371-3378), and the International Convention on International Trade in Endangered Species ("CITES") are restricting the international transportation of these materials. The practical impact of these restrictions is the decrease in the availability of abalone, oyster, snail and other mollusk shell materials.

The purfling, like the binding, generally follows the bends and curves of the instrument. The purling is placed in a channel preformed by the edge of the top (or sides or bottom) on one side and the edge of the binding on the other side. Once the purfling is placed within the channel, the top (or sides or bottom) of the instrument may be sanded or scraped such that the surface of the top is flush with the purfling, creating the decorative border.

When organic shell materials, such as mother-of-pearl or abalone, are used for purfling, it is often referred to as "shell purfling" Various other materials, such as wood or wood fiber, may be utilized instead of place of the shell purfling, or in combination with the shell purfling, such that the outside edge of a musical instrument may have an outside border formed with wood fiber purfling and a border of shell purfling immediately adjacent to the wood fiber purfling. The result is a crisp, dark border formed by the wood fiber which accentuates the flashy or luminescent appearance of the shell. The wood purfling, sometimes referred to as "marquetry," may comprise different colors, but is often alternating strips of light and dark material. The wood purfling may also come in different patterns, such as parallel lines or in a herringbone configuration. A frequently used and visually appealing configuration is a first border formed with a black-white-black wood purfling strip, an inner band of shell purfling, and a second border of black-white-black purfling strip, such that the shell purfling is sandwiched between the two wood purfling strips. It is to be appreciated that various materials may be utilized to simulate wood purfling, including not only wood, but wood fiber, plastic, and other materials. Further references to "wood purfling" should be understood to include simulated wood products.

As discussed in the present inventor's U.S. Pat. No. 8,053,053 ("the '053 Patent"), which is incorporated herein by this reference, the prior art method of installing shell purfling is a time-consuming process. One of the limitations of the known purfling strips is that the strips are not flexible and cannot be bent in the same manner as the binding. The lack of flexibility is problematic when it is desired for the inlay to be curved, which is typically the case for purfling used on instruments. The purfling of a conventional acoustic guitar requires the inlay material to placed through or around many curves which have too tight of a radius for the shell strips to achieve without breaking. One known solution to this problem is to break the strips into very, very short individual pieces as it is being inlaid into the preformed channel, in a mosaic-like method. Once in the channel, even though each short piece is straight, the cumulative effect of utilizing the individual pieces is that the inlay strips follow the desired curve of the instrument or other work piece. However, this process is very time consuming and labor-intensive.

In another method, instead of breaking the inlay strips into small pieces, ABALAM blanks are milled by a computer numerically controlled ("CNC") milling machine, or other computer controlled machine, such that the inlay strips fit exactly into the preformed channel formed by the edge of the top and the inside edge of the binding. In other words, each piece of the inlay is precisely cut to fit into a particular segment of the channel. In this method, a smaller number of pre-cut inlay pieces (such as 7 to 15 pieces) are necessary for the shell purfling. However, there are disadvantages associated with this method as well. The machinery required for this method is expensive, and the programming and milling time for each shape can require substantial time. The inventory requirements for the inlay material can also be difficult for smaller manufacturers, because different instrument models and configurations utilize different shapes of inlay material. This method also results in greater waste of inlay material than the previously described method and the method taught in the '053 Patent and further disclosed herein.

Each of the processes described above may be time consuming for another reason. Under the known methods, including the method disclosed herein, the channel for placement of the purfling on a musical instrument is formed by the edge of the binding on one side and the outside edge of either the instrument's top or bottom on the other side. When the binding is glued along the sides of the instrument, strips of TEFLON (or other materials which will not be held by the glue such as polyethylene) are used as a temporary spacer for the space which will be ultimately occupied by the ornamental purfling. Once the glue has dried and adequately set up, the TEFLON strips are removed and the individual pieces of ornamental purfling are placed and glued into the channel. This process requires that the TEFLON be milled or cut to the size of the desired piece of ornamental purfling so the ornamental purfling will fit tightly into the portion of the channel vacated by the TEFLON.

SUMMARY OF THE INVENTION

The presently disclosed invention is an ornamental purfling strip having sufficient flexibility to be placed within a curved configuration in significantly longer pieces than presently known, including purfling strips fabricated from synthetically generated materials or from inorganic materials. The presently disclosed invention also provides a method of manufacturing the flexible purfling strips. While the '053 Patent utilizes shell blanks fashioned from abalone, oyster, or other organic shell materials, the present invention expands the materials which may be utilized to include materials which are not restricted under the ESA, Lacey Act, or CITES. In one embodiment of the present invention, a synthetic material may be utilized for producing flexible purfling strips, where the synthetic material has the appearance of shell material, gems, or similar materials. For example, a synthetic opal may be utilized. The synthesis of all-silica opal is a known process. Precious opal was synthesized for the first time in the early 1970s, and the process has been improved such that the synthesized opal has structural and chemical properties which are identical to the natural precious stones, while the synthetic material can be produced in sheets and easily cut and polished. Synthetic opal comes in a variety of colors and has the lustrous and luminescent appearance of materials fabricated from mollusk shell.

Flexible purfling strips manufactured according to the present method are flexible along the long axis of the strip thereby allowing the purfling strips to be placed, as a single unit, in curved channels in both the top of an instrument which requires the strips to bend with respect to the longitudinal axis. The strips are also flexible with respect to the transverse axis which allows the purfling strips to be placed, as a single unit, in channels in the side of an instrument which follow the curves of the waist of the instrument. This flexibility is created by creating a laminated structure which comprises a layer of binding material which is overlain by a ornamental layer, where a bonding agent adheres the two layers together. As discussed in the '053 Patent, the ornamental layer may comprise an organic shell layer. In the present invention, the ornamental layer may comprise non-organic and/or synthesized materials, including synthesized products having the same visual appeal as organic shell, such as synthetic opal. Among other possible products, a suitable synthesized product is GEMLAM (www.gemlam.com.), which is available through Teknos, LLP of Brooklyn, N.Y. GEMLAM is described as thin slices of precious gem materials, such as opal and other rare and valuable materials, which are laminated between layers of engineered polymers and adhesives.

The ornamental layer comprises a plurality of breaks along the length of the strip. The binding material retains the individual fragments of the ornamental layer in a strip configuration. The binding material may comprise a material, such as vinyl, polyurethane, acetate, rubber, or other material, having a thickness of approximately 0.005 inches, which, when bonded to the individual fragments of the ornamental layer, provides sufficient flexibility to allow the purfling strip to flex longitudinally and transversely.

The flexible strips may be installed in any work piece where it is desirable to form curved sections of ornamental inlay on the work piece. Because the purfling strips may be installed as a unit as opposed to small segments of inlay material, installation of the inlay strip is done much faster than the known purfling strips. As yet another embodiment, a plurality of such purfling strips may be attached, in an end-to-end configuration, to the side of a wood purfling strip, such that an entire unit of ornamental purfling/wood purfling may be installed in a preformed channel in a single step. Alternatively, a plurality of such purfling strips may be attached, in an end-to-end configuration, where the sides of the strips are attached to a longer strip of binding material, such as the binding material utilized as part of the laminated structure discussed above. Thus, a purfling strip fabricated according to this structure comprises a top ornamental layer bound on the bottom and sides by the binding material. Because the resulting ornamental purfling strips are about as flexible as TEFLON strips, the ornamental purfling strips can be installed simultaneously with the binding, eliminating the need for installing and removing pieces of TEFLON as discussed above.

The flexible purfling strips are manufactured by milling a blank of ornamental material, such as a blank of organic shell material, such as ABALAM or a synthesized material such as GEMLAM or comparable synthesized material into a plurality of strips. The strips are typically cut with the ornamental material blank mounted to a rigid substrate with a water soluble adhesive, with the top side of the ornamental blank glued to the rigid substrate. The ornamental material blank is cut into a plurality of parallel strips, but the cutting machinery is set such that the rigid substrate is not cut through. Once the strips have been cut, the strips are removed from the rigid substrate by dissolving the water soluble adhesive.

In one embodiment of the manufacturing method, the individual ornamental strips are thereafter remounted in parallel configuration, with sides of the strips abutting the sides of the adjacent strips, to a second rigid substrate, with the ornamental face in facing contact with the rigid substrate. The strips are mounted to the rigid substrate, which may be a material such as masonite, by a water soluble adhesive. A layer of binding material is thereafter attached to the bottom side of the ornamental strips with a bonding agent, or by adhesive which comes with the binding material. For example, the binding material may comprise a vinyl adhesive tape, such as a 3M Tape #471, which material itself comprises an adhesive. Once the bonding agent or adhesive, as the case may be, have sufficiently dried and cured, the assembly comprising the substrate, the ornamental strips, and the layer of binding material is placed again into the cutting machinery, such that angle of the new cuts will be at approximately ninety degrees from the angle of the first cuts. Once again, the cutting machinery is set such that the rigid substrate is not cut through, but the ornamental strips and binding material are cut into "strips" which are at approximately ninety degrees from the strips made by the previous cutting step. Once the new ornamental strips have been cut, the ornamental strips are removed from the second rigid substrate by dissolving the water soluble adhesive. Each resulting ornamental purfling strip comprises a plurality of individual segments of ornamental material in an end-to-end configuration, with the individual segments held together as a strip by the underlying binding material. When a purfling strip is placed within the preformed channel and glued therein, the side of the strip having the binding material is placed facing the bottom of the channel, with the ornamental layer facing upward.

The flexible purfling strips may also be attached along both sides to parallel and side abutting wood or plastic binding strips, such as the strips utilized for binding, or to other purfling strips. The wood (or plastic) strip may comprise adhesive on the side abutting the ornamental purfling strip. The wood strips utilized for binding or purfling typically come in lengths of thirty-two inches. A plurality of ornamental purfling strips may be placed in an end-to-end configuration and consecutively attached to the side of a wood binding strip, resulting in a single strip of parallel ornamental and wood elements which is long enough to extend around the outside border of one half of a standard sized instrument. Alternatively, instead of attaching the ornamental purfling strip to binding strips or second purfling strip, strips of binding material may be applied to both sides of the flexible purfling strip as a means of connecting the purfling strips in an end-to-end configuration resulting in a longer strip. An acceptable binding material for the sides of the purfling strips is the vinyl tape manufactured by 3M (3M Tape #471) discussed above. A jig for attaching the wood binding strips or side strips of binding material is disclosed herein.

The flexible purfling strips may be installed in minutes, thus allowing the completion of an instrument in substantially less time than the known methods.

BRIEF DESCRIPTION OF THE DRAWINGS

FIG. 14 shows the structure of FIG. 13 after the sheet of binding material and underlying strips of ornamental material have been cut along the width of the structure, where the rigid substrate is not cut all of the way through.

DETAILED DESCRIPTION OF THE EMBODIMENTS

Current Practice for Installing Purfling from Strips of Inlay Blanks

Figure 1:
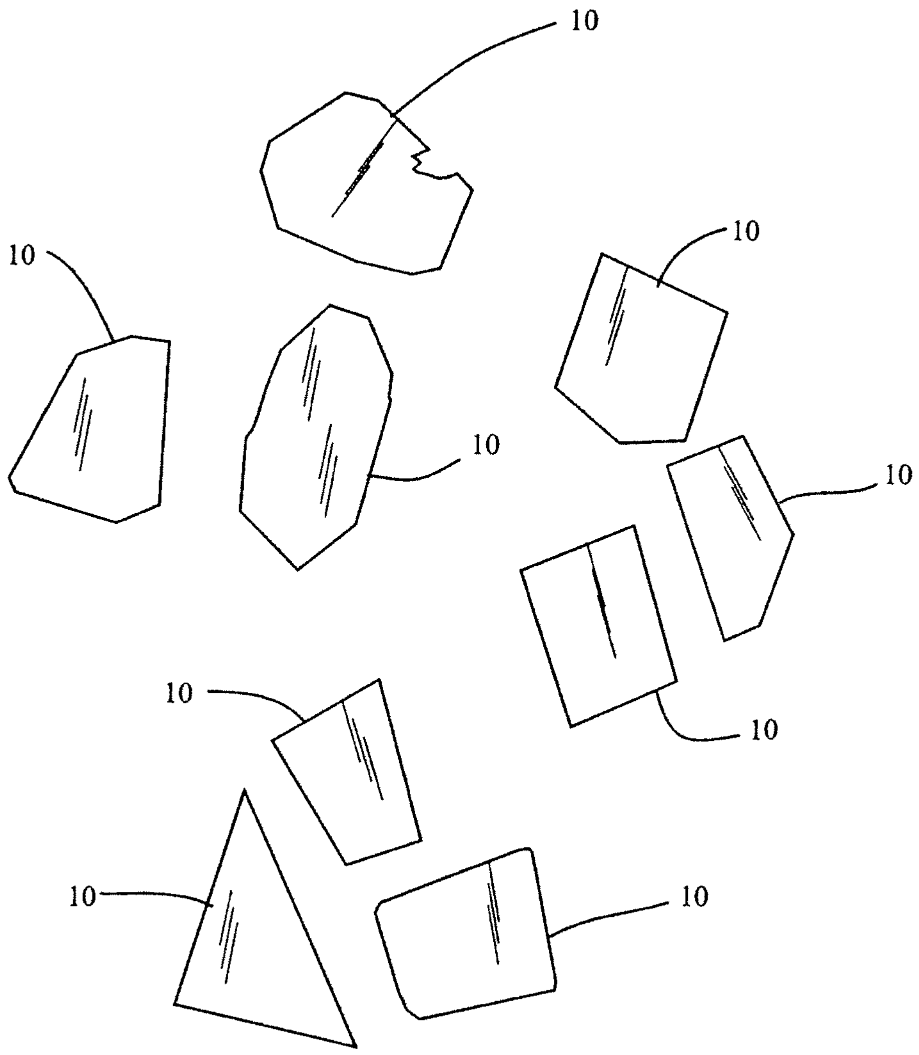
FIG. 1 shows pieces of abalone, mother-of-pearl blanks, or other pieces of ornamental material, as utilized in the prior art purfling practices utilizing shell materials.

Referring now to the figures, FIG. 1 shows examples of the shapes of blanks 10 which might be obtained directly from an organic shell. Because the blanks 10 are obtained directly from the shell, the size and shape of the blanks are limited by the size and geometry of the shell. As discussed in the '053 Patent, it is known to process such blanks to form a shell blank known as ABALAM, according to U.S. Pat. No. 5,776,581 (Sifel et al). The '053 Patent teaches the utilization of ABALAM blanks to from flexible inlay strips.

Figure 2:
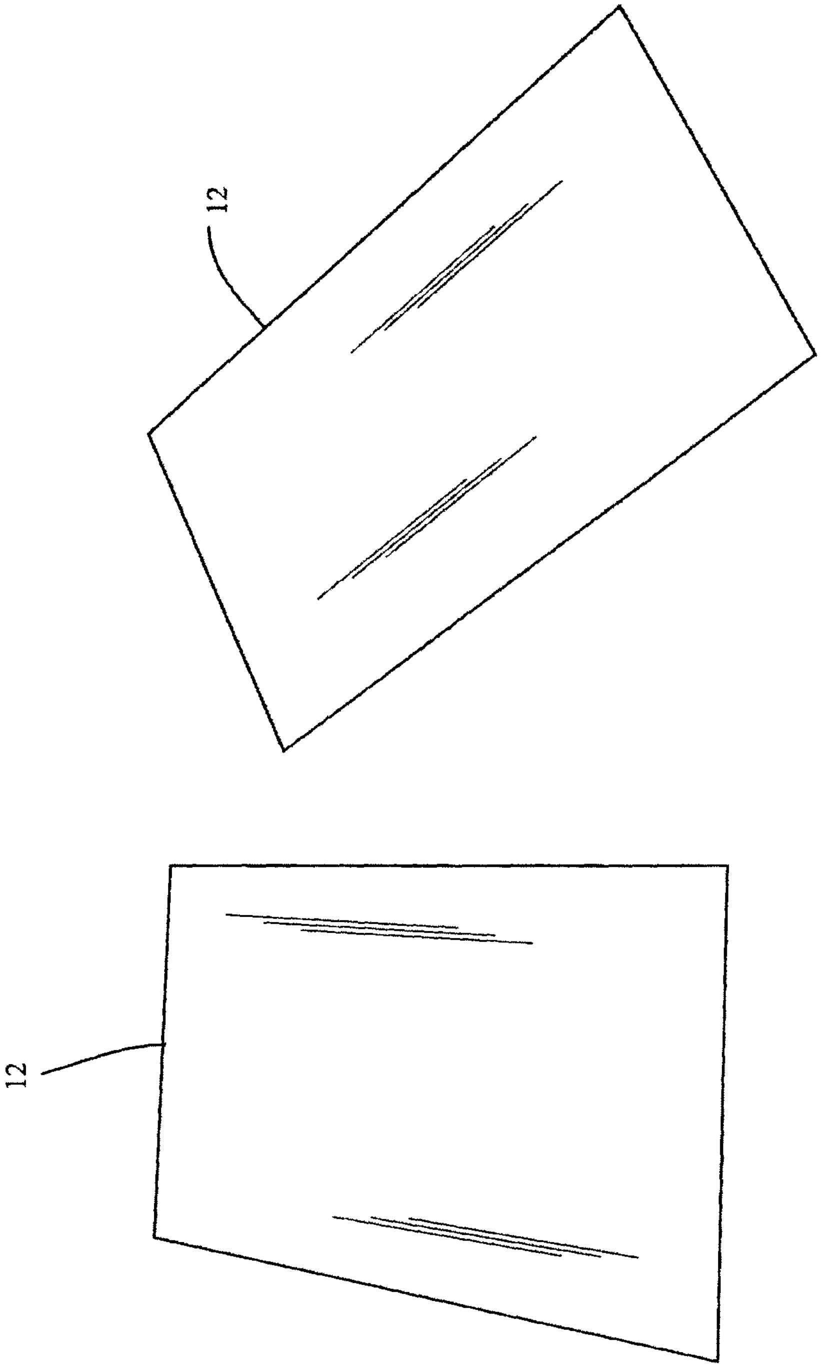
FIG. 2 shows rectangular sheets of flat ornamental purfling material, such as sheets of processed shell material (ABALAM) or a synthetic material such as GEMLAM.
Figure 3:
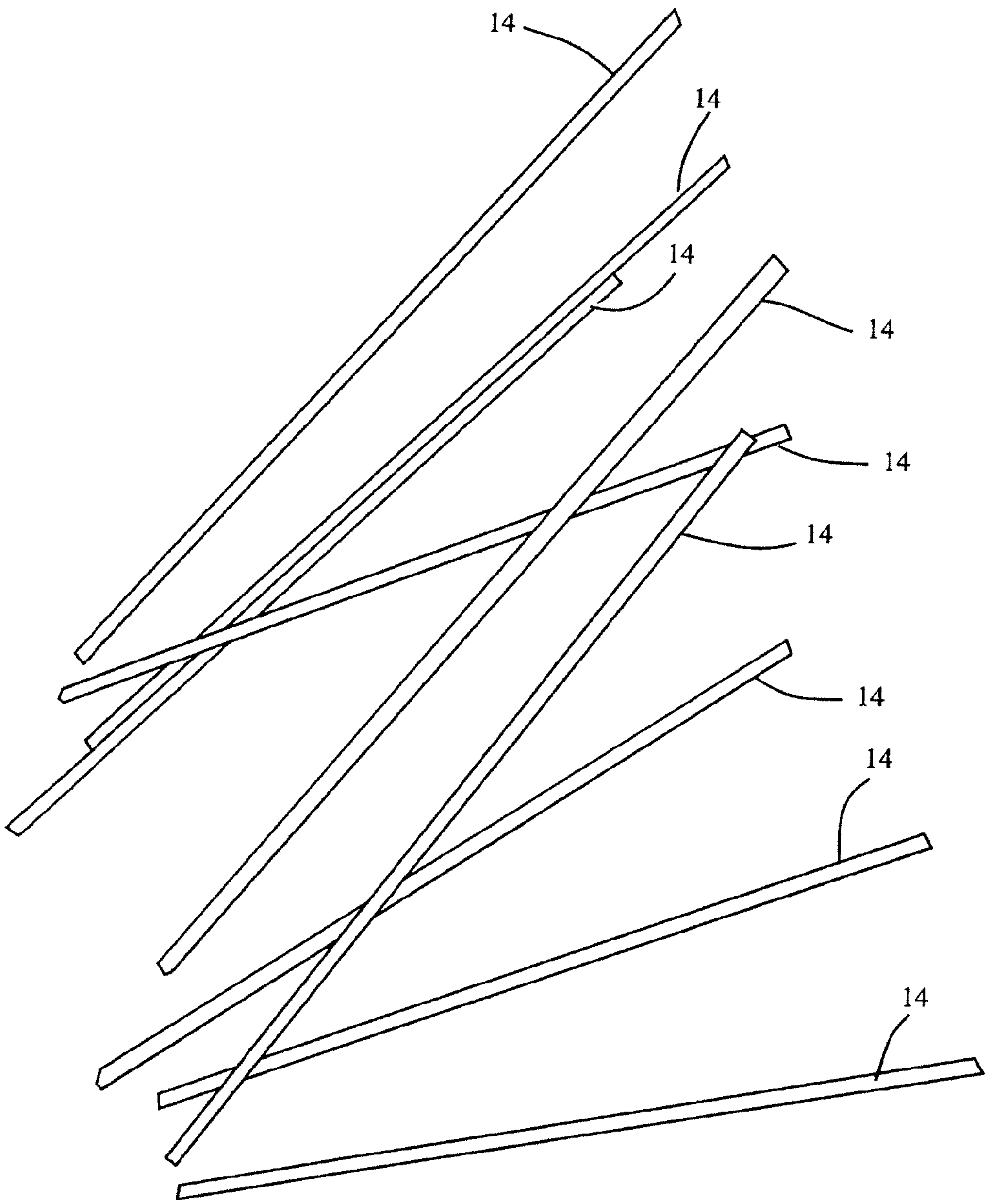
FIG. 3 shows strips of ornamental inlay material after cutting the ornamental blanks shown in FIG. 2.
Figure 4:
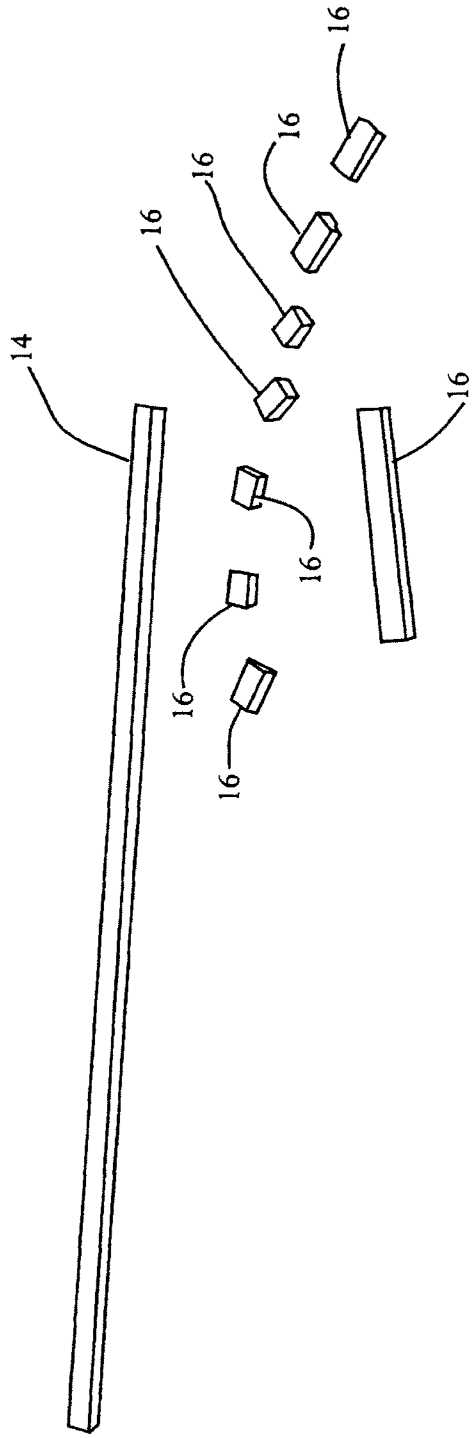
FIG. 4 shows how the strips of FIG. 3 are segmented into small pieces for insertion into a workpiece according to the presently practiced method.
Figure 5:
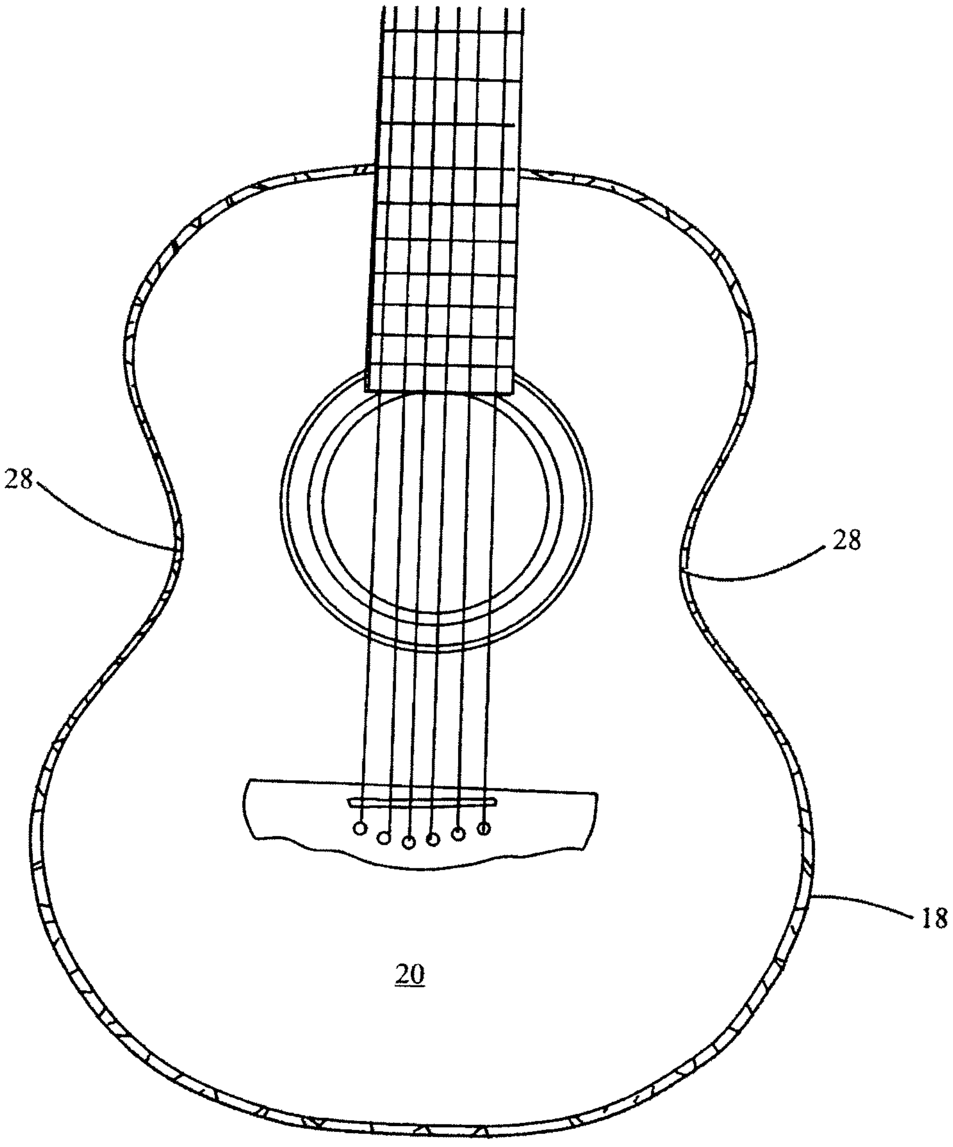
FIG. 5 shows a musical instrument having an ornamental purfling bounding the outer edge of the soundboard of the instrument.
Figure 6:
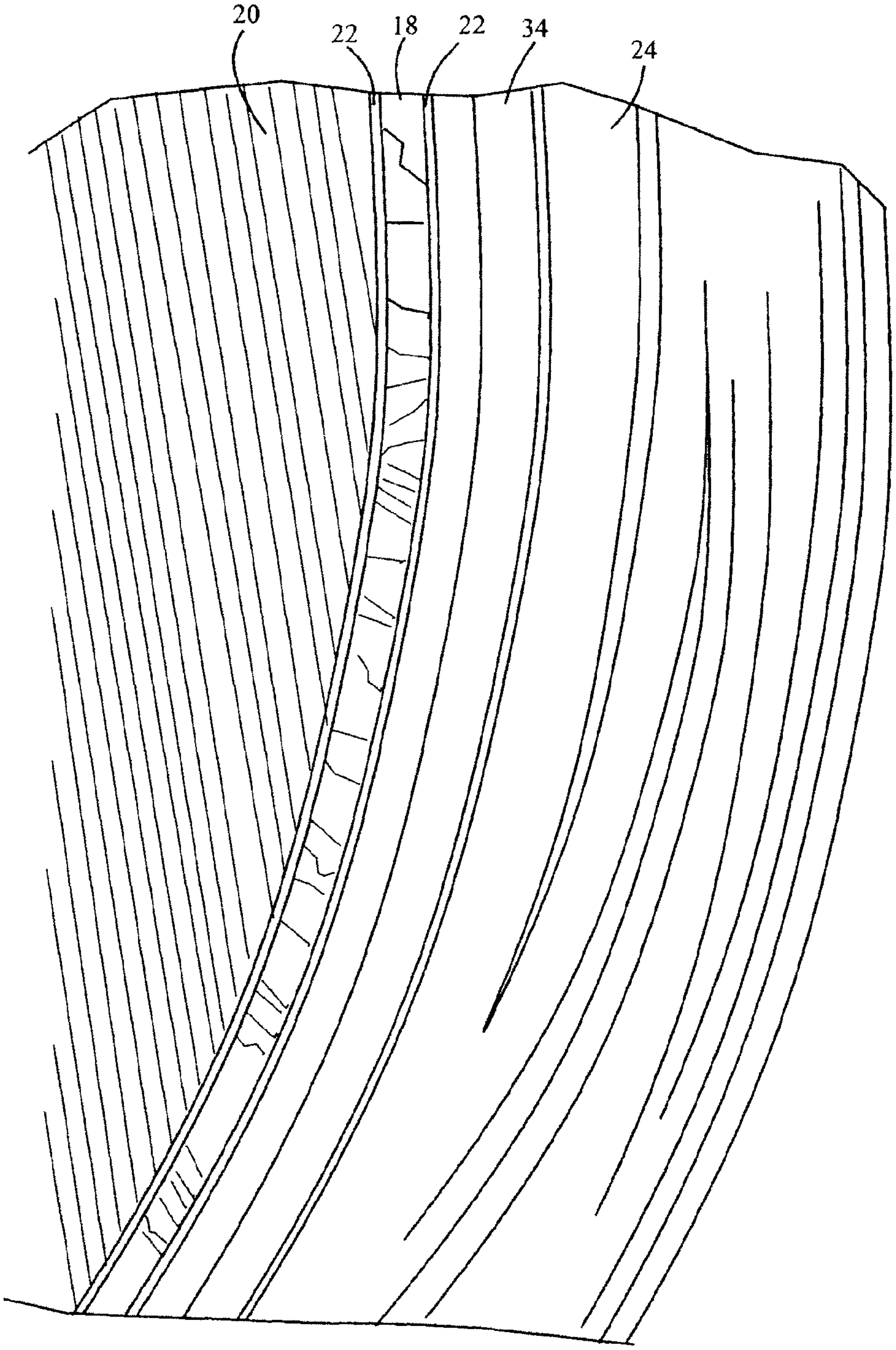
FIG. 6 shows a close-up view of the ornamental purfling of FIG. 5, showing how the ornamental purfling may be bounded on either side by wood purfling material.

FIG. 2 shows examples of inlay blanks 12 which have been processed into a sheet configuration. Such inlay blanks may comprise ABALAM. Alternatively, such inlay blanks may comprise synthetic or inorganic materials, such as synthesized opal or other attractive synthesized materials. Under the current practice, the inlay blanks are typically cut into long strips 14 as shown in FIG. 3. In order to be used to form purfling having curving features, the long strips 14 are typically cut into shorter pieces 16 as illustrated in FIG. 4. Utilizing these shorter pieces 16, an ornamental border 18 may be placed around the perimeter of the face 20 of a musical instrument, such as a guitar 22 shown in FIG. 5. FIG. 6 shows a close up view of an ornamental border 18 formed with the shorter pieces 16 of ornamental purfling.

As shown in FIG. 6, the ornamental border 18 formed by the ornamental purfling may be bordered on each side by wood purfling strips 22. The wood purfling strips 22 are typically available in lengths of thirty-two inches. Because of the relatively small width of the wood purfling strips 22 and the flexibility of the materials used for the fabrication of the strips, the wood purfling strips are usually flexible enough to be installed around curves of an instrument without performing the wood purfling strips or cutting the strips into smaller segments as required for installation of ornamental purfling according to the prior art.

Figure 7:
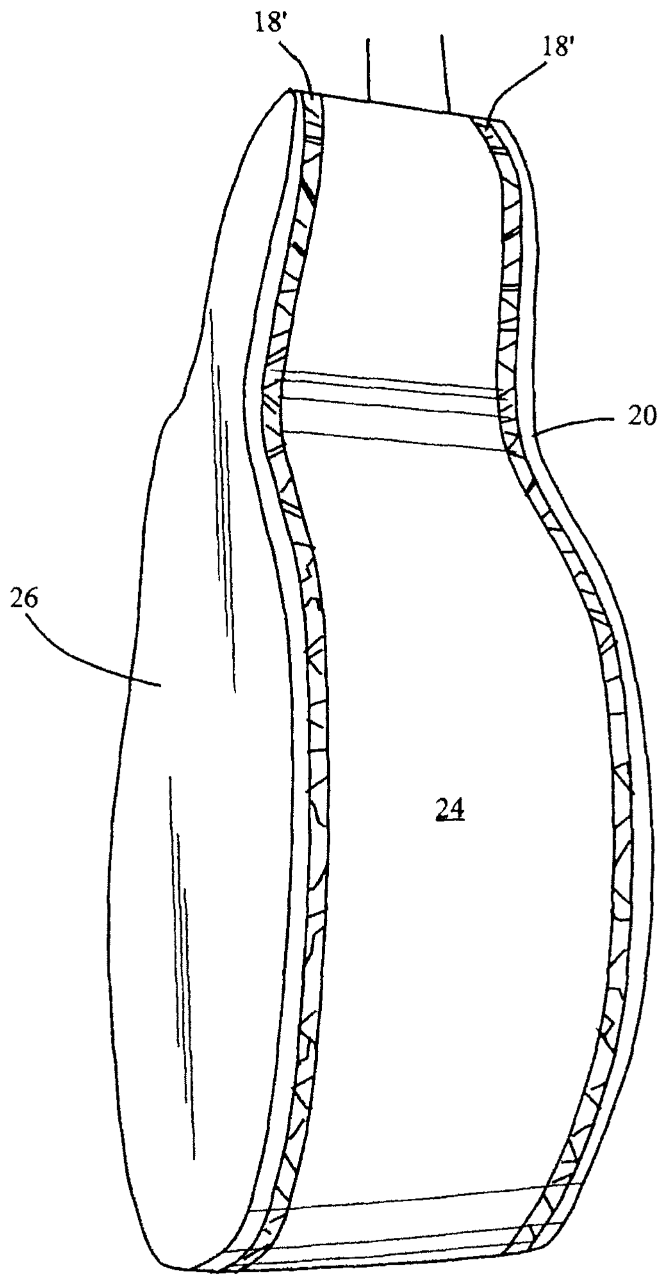
FIG. 7 shows how ornamental purfling may also be utilized to ornament the side walls of a musical instrument.

Aside from the top 20 of a musical instrument, other portions of a musical instrument may be ornamented with ornamental purfling. As shown in FIG. 7, the sides 24 of a musical instrument may be ornamented with ornamental border 18' which is adjacent to the top 20 and the back 26 of the instrument. As can be seen by comparing FIGS. 5-6 with FIG. 7, when ornamental border 18' comprising ornamental purfling is placed around the sides 24 of a musical instrument, the curves which must be negotiated by the purfling change. Assuming the top 20 of the instrument may be defined by a single plane, the curve of the ornamental border 18 requires flexibility of the ornamental purfling segments in two dimensions, where the top surface, or show face 30 of the ornamental purfling remains in the same plane as the top of the instrument. For purposes of this specification, this flexibility, where the show face 30 of the ornamental purfling remains in a single plane, is referred to herein as longitudinal flexibility. However, the sides 24 of an instrument typically are not defined by a single plane, because the instrument will usually have some form of waist 28. As shown in FIG. 7, when an ornamental border 18' of ornamental purfling is placed about the sides 24 of an instrument, the show face 30 of the ornamental purfling follows the shape of the sides, such that the show face cannot be defined by a single plane. Therefore, an ornamental purfling strip would have to be flexible about its show face 30 for a single strip to be utilized as a significant portion of the side purfling. This flexibility is referred to herein as transverse flexibility. While wood purfling strips typically have both longitudinal flexibility and transverse flexibility, the known ornamental purfling strips, typically fashioned from shell material, have neither, thus requiring the strips to be cut into shorter pieces 16 as indicated in FIG. 4.

Figure 8:
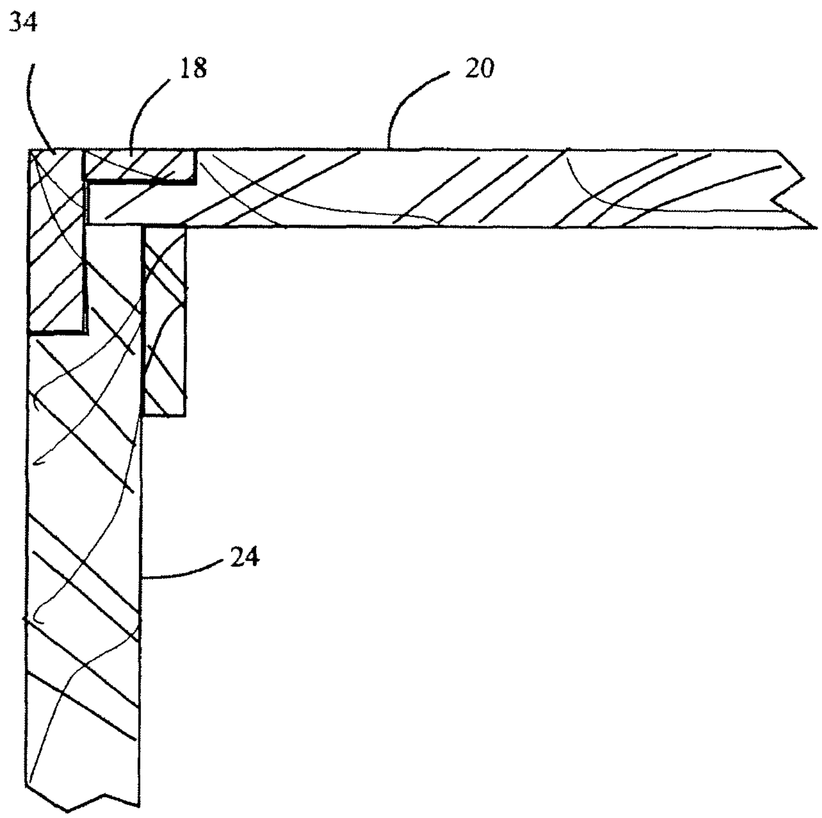
FIG. 8 schematically shows how the channel for the purfling is formed between the binding and the top of an instrument.

When inlay materials are placed within a work piece, the materials are set within a depression or channel. FIG. 8 shows schematically how a channel 32 for placement of purfling 18 is typically preformed in the top of a musical instrument. The top 20 and sides 24 of the instrument are first routed to form a seat for the binding 34 to partially form channel 32. Binding 34 is thereafter seated at the outermost corner of the instrument, thereby forming the outer wall of channel 32, where the inner wall is formed by the edge of top 20. Channels may similarly be formed between the edge of the binding 34 and the sides 24 of an instrument, or the back 26 of an instrument, such that ornamental borders of the purfling may be placed in the sides and/or back of the instrument.

The Present Invention

Figure 9:
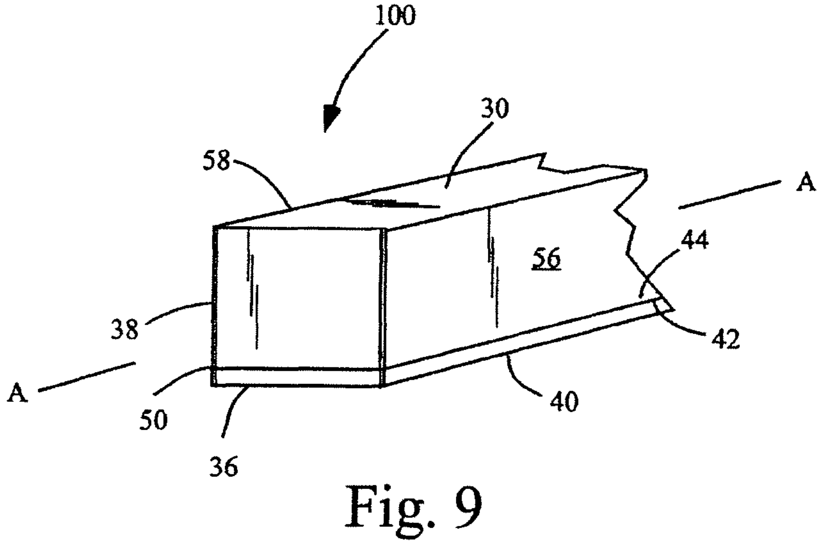
FIG. 9 shows a schematic view of the end of an embodiment of an ornamental purfling strip manufactured according to the disclosed method.

The purfling strips 100 manufactured according to the present method have both longitudinal flexibility and transverse flexibility, which allows the strips to be installed in full length strips in the preformed channels of a work piece as opposed to being cut into shorter pieces 16 according to the current practice. As shown in FIG. 9, the purfling strips 100 of the present method comprise a laminated structure. This laminated structure comprises a first layer 36 of binding material and a second layer 38 of ornamental matter, which might comprise either shell blanks 10 as shown in FIG. 1, or, as taught in the '053 Patent, strips 14 cut from a sheet 12 of manufactured shell laminate, such as ABALAM, or from a sheet 12' of an inorganic material, such as synthetic opal. The binding material used for first layer 36 preferably has both longitudinal and transverse flexibility. Among the acceptable binding materials are vinyl polyurethane, acetate, or rubber. The inventor herein has found that an acceptable binding material for first layer 36 is vinyl tape manufactured by 3M (3M Tape #471), which has a thickness of approximately 0.005". First layer 36 has a first length and second layer 38 has a second length, wherein the first length and second length will usually be equivalent. First layer 36 has a a channel-facing surface or downwardly facing surface 40, which is the surface which comes into contact with the bottom surface of channel 32. First layer 36 further comprises an upwardly facing surface 42 which is the surface which abuts second layer 38, which is the ornamental material. It is to be appreciated that the terms "downwardly" and "upwardly" are with respect to the position of first layer 36 as disposed within channel 32, with the downwardly facing surface 40 in contact with the bottom surface of the channel 32 and the upwardly facing surface 42 facing in the opposite direction from the bottom surface of the channel.

A first thickness is defined between the downwardly facing surface 40 and the upwardly facing surface 42. This first thickness is generally 0.005 inches, depending upon the particular binding material and its properties. Second layer 38 has an exposed surface previously identified as show face 30. Second layer 38 also comprises a binding-material facing surface 44. A second thickness is defined between the exposed surface and the binding-material facing surface. This second thickness will be the thickness of the ornamental layer which will range from 0.01 to 0.050 inches. Second layer 38 comprises a plurality of breaks 46 interposed along its length, referred to above as the second length.

A bonding agent or adhesive 50 is disposed between the upwardly facing surface 42 of the first layer 36 and the binding-material facing surface 44 of the second layer 38. The bonding agent 50 attaches the first layer 36 to the second layer 38. Various bonding agents may be utilized, including high performance adhesive transfer tape manufactured by 3M, including model number 467MP or transfer tapes utilizing 3M 300LSE adhesive, or suitable spray adhesives. Alternatively, vinyl tape manufactured by 3M (3M Tape #471) is manufactured with an acceptable adhesive. A protective coat of clear epoxy may be applied to show face 30 to protect the appearance of the ornamental material.

Breaks 46 typically, but not necessarily, extend completely through second layer 38, thereby forming individual segments 48 which are bound together with first layer 36 of binding material. The individual segments 48 may each comprise a rectangular solid segment, where the second layer comprises a plurality of rectangular solid segments. Breaks 46 may be made to the individual strips by machining or impact means. Breaks 46 may also be made according to the method described below.

A method for creating the purfling strips 100 from sheets 12 of inorganic blank material, such as synthetic opal, comprises the following steps. Using a water soluble adhesive, such as hide glue, a sheet of ornamental blank 12 is glued face down to a sheet of rigid substrate material 52, such as Masonite or similar material, typically having dimensions of W×L. The glued assembly is thereafter cut into strips 14, but not cutting all of the way through the rigid substrate 52. Typically this process is done by a computer numerically controlled ("CNC") milling machine, which may have means for holding the work-piece (i.e, the glued assembly) in place by means of a vacuum seal on the bed of the CNC mill. The CNC milling machine is employed with depth control to cut the work piece such that the ornamental blank sheet 12 is cut into strips 14 but the rigid substrate 52 is not cut all of the way through.

In a first embodiment of the method, a thin sheet (approximately 0.005" thick) of binding material, such as the 3M vinyl tape discussed above, acetate or polyurethane, is affixed to the back side of the separated strips of ornamental blank material, thereby creating a layered configuration comprising, from bottom to top, the rigid substrate 52, the ornamental layer (second layer 38) and the binding material layer (first layer 36) At this point, the strips of the ornamental blank have been milled into the proper width (generally 0.050") but the strips remain glued to the rigid substrate 52. The inventor herein has found that the 3M vinyl tape discussed above, acetate, or polyurethane are the preferred binding materials because each possesses several critical properties: each are flexible enough to bend but stiff enough to retain a linear path, are impervious to the water bath required for removal of the ornamental blank strips from the rigid substrate 52, and each material holds fast to the ornamental blank with either integral adhesive or added adhesives. Such added adhesives for attaching the binding material to the strips of ornamental blank include 467MP or 300LSE hi-performance adhesives, manufactured by 3M Corporation, or adhesives having similar properties.

In a first embodiment of the manufacturing method, after the binding material is attached to the backs of the milled strips, the layered assembly, which comprises rigid substrate 52, the ornamental layer (second layer 38) and the binding material layer (first layer 36), is precisely located in a laser cutter. The laser cutter cuts around the perimeter of each individual strip 14 of ornamental material cutting clear through the binding material layer such that each strip is overlain by a separated layer of binding material, which has been separated from the binding material covering adjacent strips. After the laser cutting, the layered assembly is placed in a hot water bath to release the strips from the rigid substrate 52, resulting in individual laminated strips comprising first layer 36 and second layer 38. Because of the previously described laser cutting step, the first layer 36 of binding material is the exact same width and length as the individual strip 14 of ornamental blank as shown schematically in FIG. 9.

Figure 10:
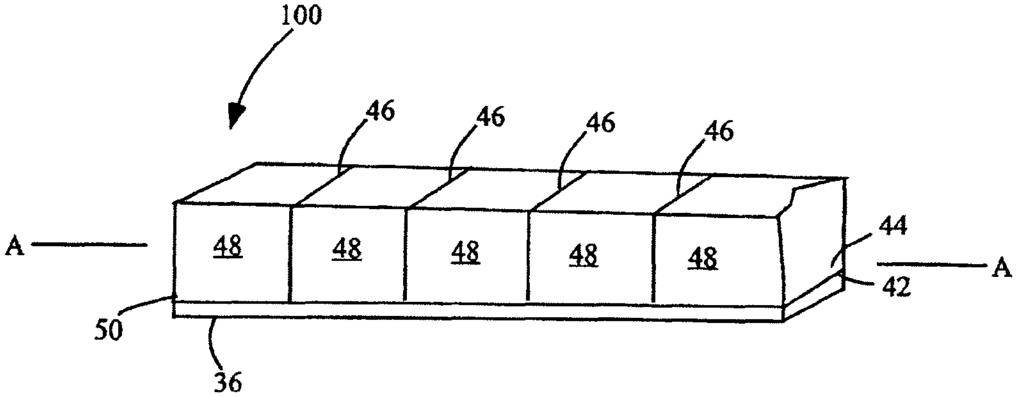
FIG. 10 shows a schematic view of the side of an embodiment of an ornamental purfling strip manufactured according to the disclosed method.

The next step in this embodiment of the method is to break or cut the second layer 38 of ornamental material into small individual segments 48 or pieces, but leaving the first layer 36 of binding material intact, resulting in purfling strips 100. FIG. 10 schematically shows the general orientation of the breaks 46 in a flexible purfling strip according to the present invention. The means for breaking the strips into individual segments 48 or pieces may be accomplished by employing a CNC mill. If a CNC mill is used for making the breaks 46, the flexibility of the purfling strips 100 may be controlled by adjusting the number of breaks by programming less or more breaks into the CNC mill as desired.

Because the purfling strips 100 have the thin first layer 36 of binding material, the strip retains its integrity. Each individual segment 48 directly abuts an adjacent segment such that the individual breaks are not visually noticeable, particularly because of the patterned appearance of the show face 30 of the ornamental material. The resulting purfling strip 100 has both longitudinal and transverse flexibility such that it can be inlaid alone around the sides or edges of a channel 32 or inlaid simultaneously with the bindings and marquetry of an instrument. The flexible purfling strips 100 can be glued and otherwise attached by all the traditional methods and means used in the instrument making industry. The ornamental purfling strips 100 made with this method may also be in other industries and arts where decorative trim is used (for instance, hi-end surfboards, jewelry boxes, humidors, casework, etc.).

Figure 11:
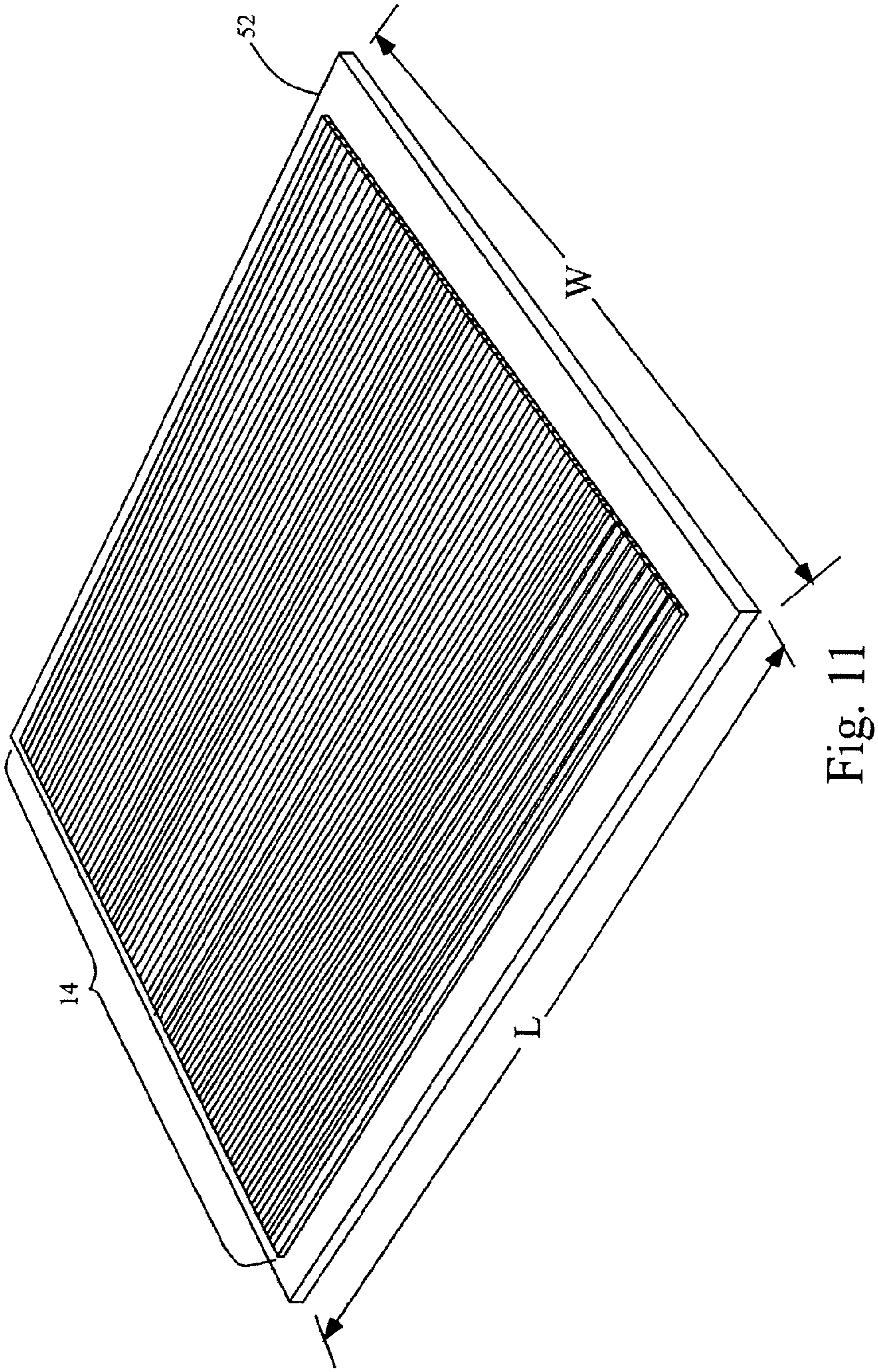
FIG. 11 shows a rectangular sheet of flat ornamental blank glued to a rigid substrate, after the blank has been cut into strips.
Figure 12:
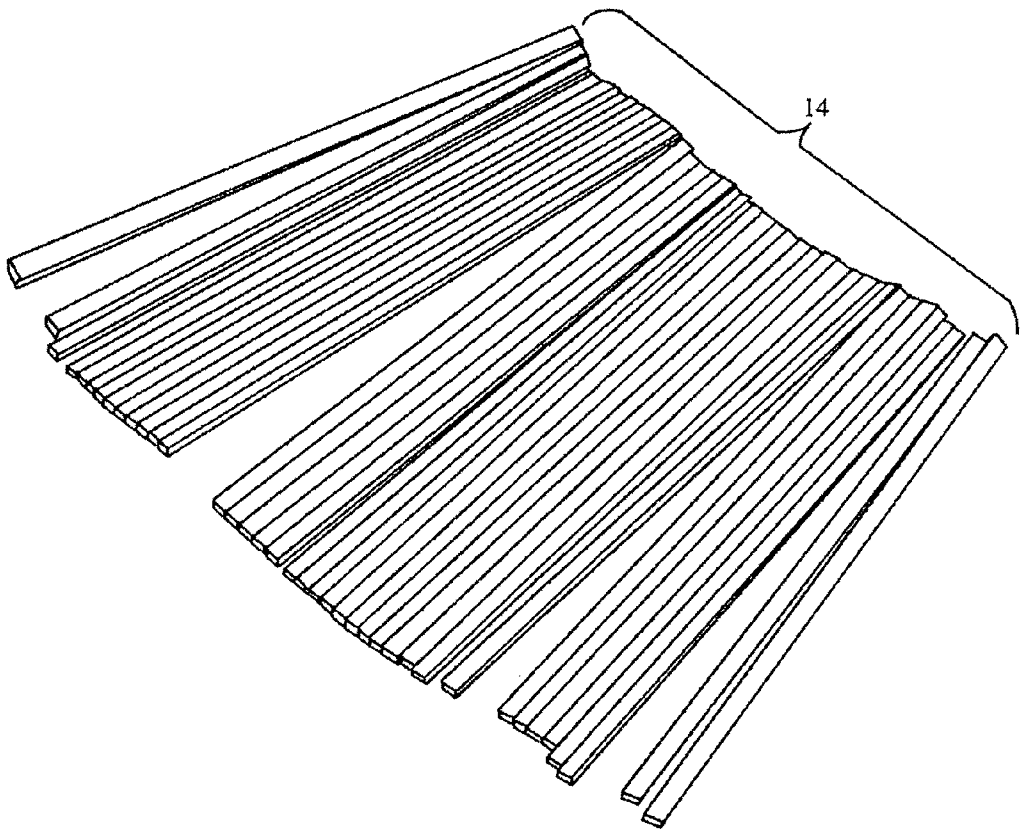
FIG. 12 shows the strips of ornamental material of FIG. 11 after the strips have been removed from the rigid substrate.
Figure 13:
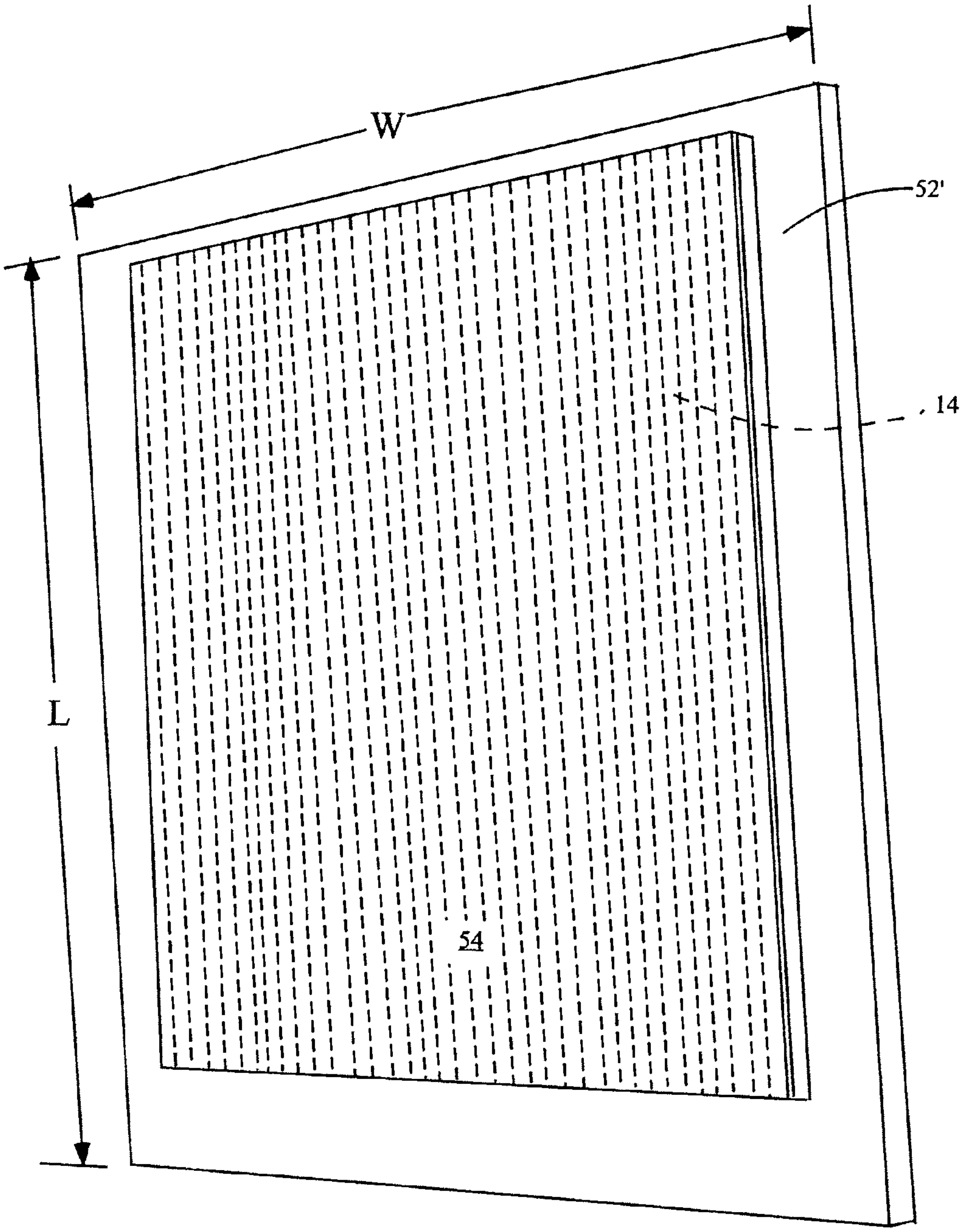
FIG. 13 shows the strips of FIG. 12 remounted to a rigid substrate and having a sheet of binding material affixed to the top surface of the strips of ornamental material.

In a second embodiment of the manufacturing method, as in the embodiment disclosed above, a sheet 12 of ornamental blank material, such as ABALAM or a sheet 12' of an inorganic material, such as synthetic opal, is glued exposed face down with hide glue or other water soluble adhesive to a rigid substrate 52 such as a sheet of Masonite or similar material, typically having dimensions of W×L. As illustrated in FIG. 11, the glued assembly is thereafter cut into strips 14, but not cutting all of the way through the rigid substrate 52. After being cut, strips 14 are removed from the rigid substrate 52 by dissolving the water soluble adhesive. The strips 14 are thereafter mounted to a second rigid substrate 52' with a water soluble adhesive, such that the strips are arranged in parallel with one another, the parallel strips defining a long axis oriented along length L of the rigid substrate 52'. The sides of adjacent strips 14 are mounted such that adjacent strips abut one another in direct contact. When first mounted to second rigid substrate 52', the parallel strips each comprise a front side (show side 30) attached to the second rigid substrate and an exposed back side. A panel 54 of binding material, such as the 3M vinyl tape discussed above, acetate or polyurethane, is affixed to the exposed back sides of the adjacent strips 14, as shown in FIG. 13, utilizing either an integral adhesive in the material, as found with the 3M vinyl tape, or a bonding agent such as 467MP or 300LSE hi-performance adhesives, manufactured by 3M Corporation, or adhesives having similar properties.

Figure 14:
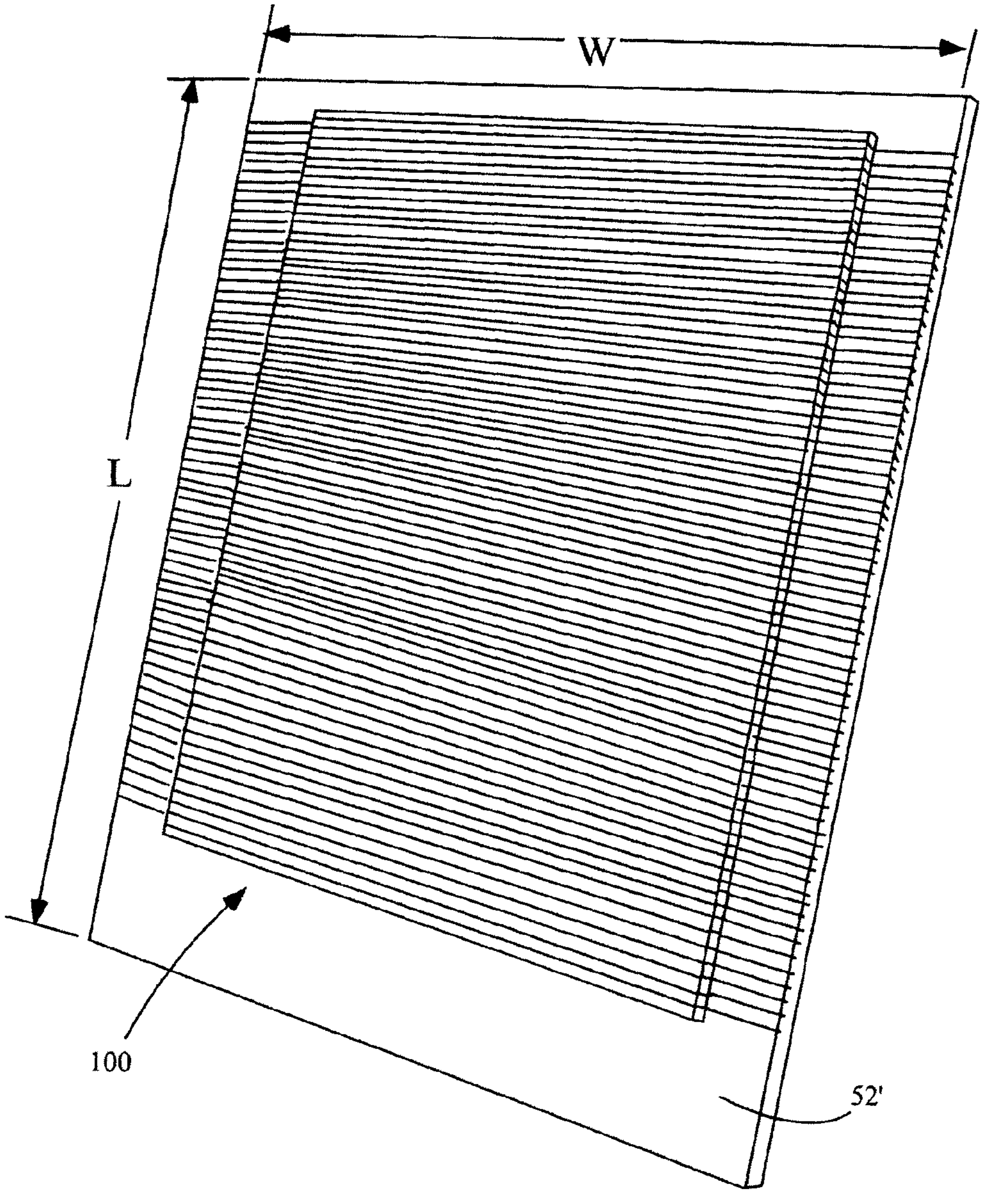

Once the adhesive or bonding agent has set which attaches panel 54 to the exposed back sides of adjacent strips 14, the layered assembly of rigid substrate 52', the attached strips 14 (second layer 38) and the binding material layer (first layer 36) are placed in a cutting apparatus. The cutting apparatus cuts panel 54 of binding material and the underlying ornamental strips 14 at ninety degrees to the long axis, but does not cut through rigid substrate '52. As shown in FIG. 14, the resulting cuts are oriented along the width of the rigid substrate 52'. This cutting results in a plurality of purfling strips 100, each strip having a laminated structure such as that shown in FIG. 10, the laminated structure comprising a first layer 36 of binding material and a second layer 38 comprising a plurality of segments 48 of ornamental material. As further shown in FIG. 10, a longitudinal axis A may be defined by the length of the resulting purfling strip 100. Each strip comprises a first side 56 and a second side 58, where the first side 56 defines a first plane and the second side 58 defines a second plane, and the first plane and the second plane are each parallel to the longitudinal axis A. The purfling strips 100 are removed from the rigid substrate 52' by dissolving the water soluble adhesive, resulting in a plurality of separated strips.

It is to be appreciated that the reason the strips 14 are mounted to a second rigid substrate 52' is that when the strips are originally cut when mounted on the first rigid substrate 52, the strips are separated by the width of the saw cut. If the strips, while still mounted on the first rigid substrate 52, were immediately cut again at an angle of ninety degrees to the first cut, the gap between the plurality of segments 48 would be too large, being visually discernible. By removing the strips 14 from the first rigid substrate 52, and remounting the strips to the second rigid substrate 52', the strips are repositioned such that the strips are in contact with one another, thereby removing the space created by the first saw cut.

As discussed above, wood purfling strips 22 typically comes in lengths of thirty-two inches. As shown in FIG. 6, the ornamental border 18 formed by the ornamental purfling may be bordered on each side by wood purfling 22 or other types of marquetry. Because the ornamental purfling strips 100 of the present invention have sufficient flexibility to be mounted at the same time as the wood purfling strips 22, the installation of the ornamental purfling strips may be facilitated by preattaching a plurality of ornamental purfling strips, in an end-to-end configuration, to either the side of a wood purfling strip 22. Alternatively, individual lengths of ornamental purfling strips may be held in an end-to-end configuration by attaching a binding material to either one or both sides of the purfling strips 100. Attaching the individual lengths of purfling strips in this fashion to either word purfling strips 22, of side binding material (also indicated as strips 22) results in a single purfling unit thirty-two inches in length, where the wood purfling strip (or the two-side adhesive tape) acts as a reinforcement member for the plurality of ornamental purfling strips 100. Therefore, an embodiment of the present invention comprises preattaching ornamental purfling strips 100 to a reinforcement member such as wood purfling strips 22 or side binding material 22'. The wood purfling strips 22 are available with adhesive along the side, such that the ornamental purfing strips 100 may be attached in parallel length wise attachment to the wood purfling strips, with a side 56 of the ornamental purfling strip in lengthwise attachment to a side of the wood purfling strip or to a side binding material.

Figure 15:
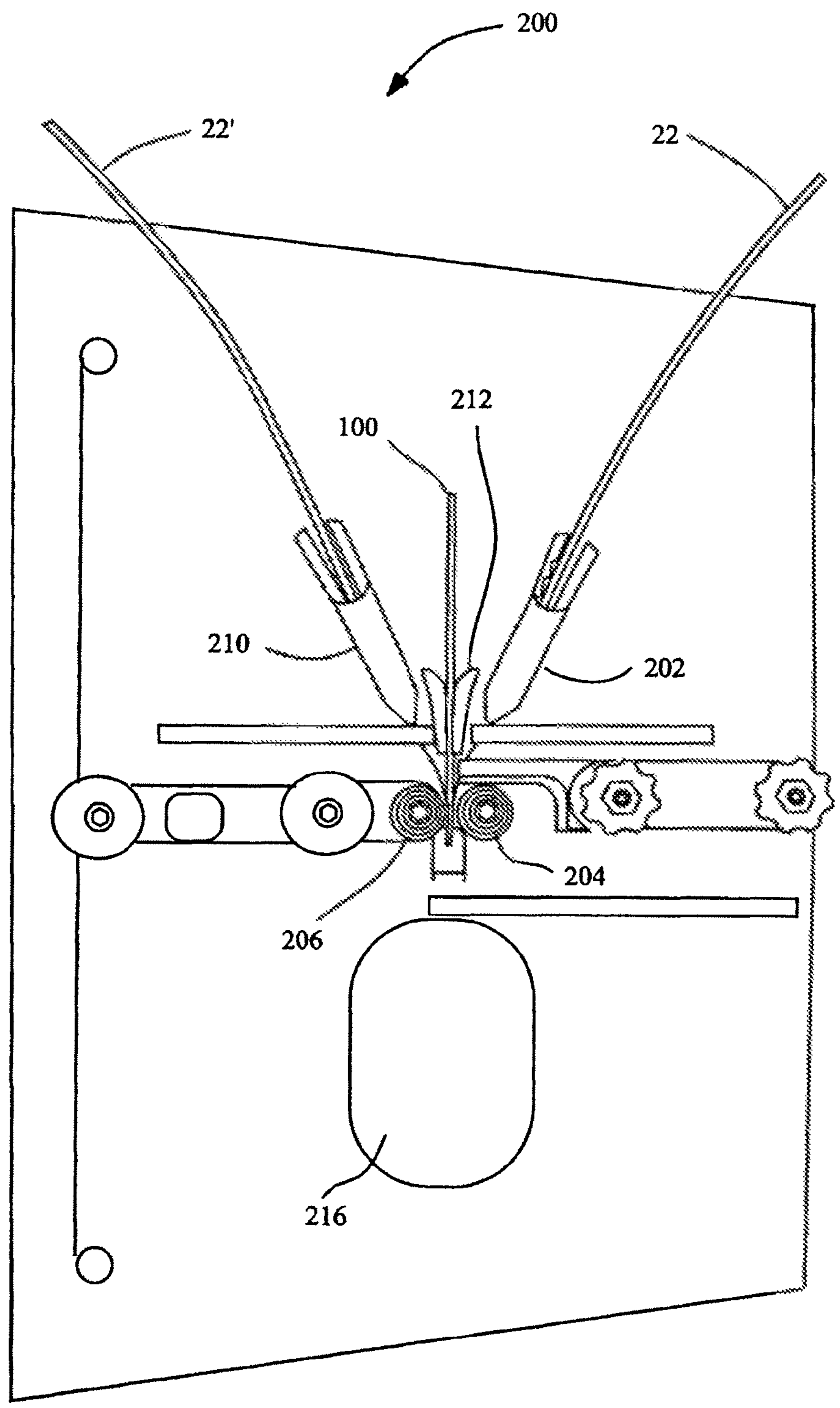
FIG. 15 shows a jig assembly which might be utilized to attach, in lengthwise arrangement, a plurality of strips of ornamental purfling to form a longer length of purfling material by affixing strips of binding material to the sides of the plurality of strips.
Figure 16:
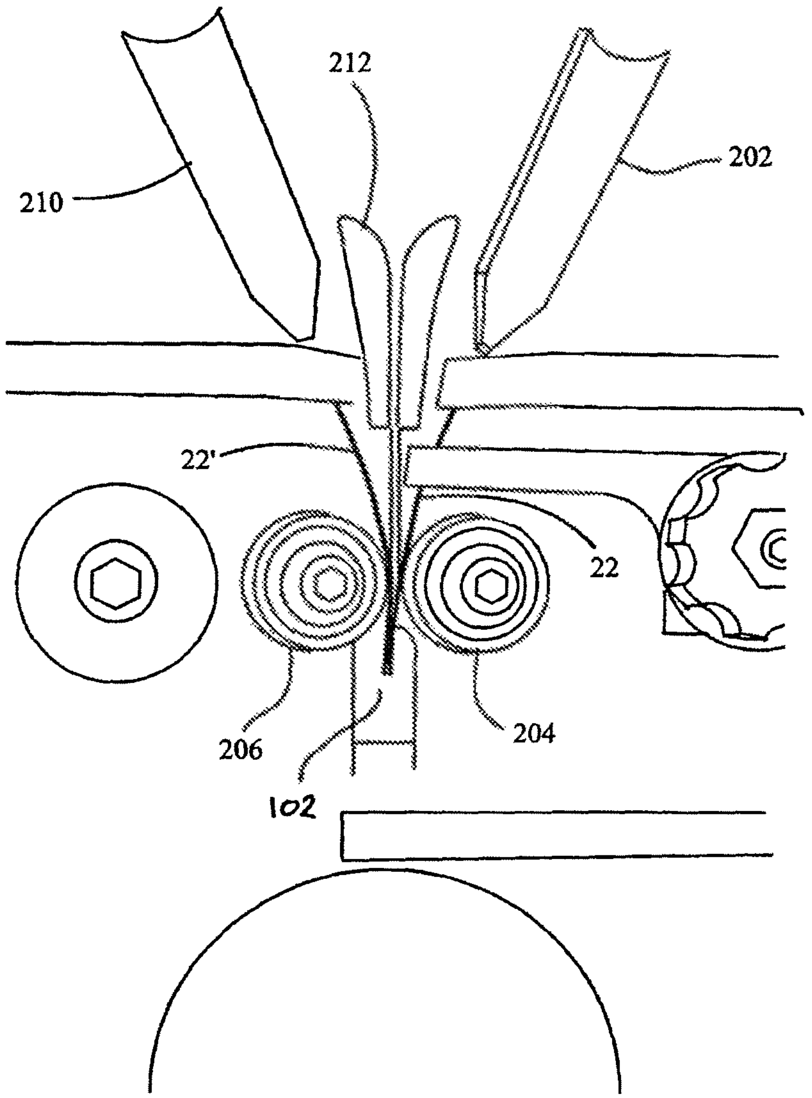
FIG. 16 shows a closer view of the portion of the jig assembly shown in FIG. 15 which affixes the binding material to either or both sides of the purfling strips

Attachment of the ornamental purfling strips 100 to wood purfling strips 22 or to side binding material may be facilitated by using a jig 200 such as that illustrated in FIG. 15. As shown in FIG. 15, wood purfling strip 22 and/or side binding material is fed into upper guides 202 or 210, which guides the wood purfling strip 22/side binding material into a pair of opposite facing rollers 204 and 206. Spacing between rollers 204 and 206 is controlled by tensioning assembly 208. Support purfling 22' or other protective structure may be fed into lower guide 210. The support purfling 22' is used to support and protect the ornamental purfling strip 100, which is fed into the center guide 212 of the jig. The ornamental purfling strip 100 is only attached to wood purfling strip 22 or to binding material, but is not attached to the support purfling 22'. As shown in FIG. 16, wood purfling strip 22 or side binding material and supporting wood purfling strip 22' are fed into rollers 204 and 206. Ornamental purfling strip 100 is thereafter fed into center guide 212, where downward pressure asserted on the ornamental purfling strip can be adjusted with an adjustable dog. As a first ornamental purfling strip is attached to wood purfling strip 22 or to side binding material a second ornamental purfling strip can be fed into the device directly after the first, such that the entire length of the wood purfling strip, or a length of side binding material, has end-to-end lengths of ornamental purfling strips attached in a side-by-side configuration. Cutout 216 allows the operator greater access to pull the purfling strips through the mechanism. The completed ornamental purfling member is removed from the jig 200 and ready for installation in a work piece.

The completed ornamental purfling member 102 simply lays into a pre-formed channel 32 in the work piece. If the work piece is a musical instrument, the entire soundboard can be inlaid in this fashion in minutes, which is many times faster than the industry standard for inlaying a soundboard with ornamental purfling around the perimeter.

While the above is a description of various embodiments of the present invention, further modifications may be employed without departing from the spirit and scope of the present invention. Thus the scope of the invention should not be limited according to these factors, but according to the following claims.

What is claimed is:

1. A laminated strip of inlay material having longitudinal flexibility for disposition in a preformed channel in a musical instrument, the laminated strip comprising:

a first layer comprising a first binding material having a first length, the first layer having a downwardly facing surface and an upwardly facing surface, defining a first thickness there-between;

a second layer of an ornamental material having a second length, wherein a longitudinal axis is defined by the second length, the second layer having an exposed surface and a binding-material facing surface defining a second thickness there-between, the second layer further comprising a plurality of breaks interposed along the second length wherein each break is perpendicular to the longitudinal axis thereby increasing the longitudinal flexibility sufficient to allow disposition within the preformed channel of the musical instrument; and an adhesive or bonding agent disposed between the upwardly facing surface of the first layer and the binding material facing surface of the second layer, thereby attaching the first layer to the second layer.

2. The laminated strip of inlay material of claim 1 wherein the ornamental material comprises a synthesized material.

3. The laminated strip of inlay material of claim 2 wherein the ornamental material comprises a synthetic opal.

4. The laminated strip of inlay material of claim 1 wherein the ornamental material comprises an organic shell material.

5. The laminated strip of inlay material of claim 1 comprising a first side and an opposite facing and parallel second side.

6. The laminated strip of inlay material of claim 5 further comprising areinforcement member attached to the first side of the laminated strip.

7. The laminated strip of inlay material of claim 6 wherein the reinforcement member comprises a strip of wood purfling.

8. The laminated strip of inlay material of claim 6 wherein the reinforcement member comprises a second binding material.

9. The laminated strip of inlay material of claim 1 wherein the first binding material comprises a vinyl tape.

10. The laminated strip of inlay material of claim 8 wherein the second binding material comprises a vinyl tape.

11. A laminated strip of inlay material having longitudinal flexibility for disposition in a preformed channel in a musical instrument, the laminated strip comprising:

a first layer comprising a first binding material having a first length, the first layer having a downwardly facing surface and an upwardly facing surface, defining a first thickness there-between;

a second layer comprising a plurality of rectangular solid segments of ornamental material, wherein the segments are in an end-to-end configuration, wherein a second length is defined by the plurality of rectangular solid segments, wherein a longitudinal axis is defined by the second length, the second layer having an exposed surface and a binding-material facing surface defining a second thickness there-between wherein a break separates each solid segment, said breaks perpendicular to the longitudinal axis thereby increasing the longitudinal flexibility sufficient to allow disposition within the preformed channel of the musical instrument;

and an adhesive or a bonding agent disposed between the upwardly facing surface of the first layer and the binding-material facing surface of the second layer, thereby attaching the first layer to the second layer.

12. The laminated strip of inlay material of claim 11 wherein the ornamental material comprises a synthesized material.

13. The laminated strip of inlay material of claim 12 wherein the ornamental material comprises a synthetic opal.

14. The laminated strip of inlay material of claim 11 wherein the ornamental material comprises organic shell material.

15. The laminated strip of inlay material of claim 11 comprising a first side and an opposite facing and parallel second side.

16. The laminated strip of inlay material of claim 11 further comprising a reinforcement member attached to the first side of the laminated strip.

17. The laminated strip of inlay material of claim 16 wherein the reinforcement member comprises a strip of wood purfling.

18. The laminated strip of inlay material of claim 16 wherein the reinforcement member comprises a second binding material.

19. The laminated strip of inlay material of claim 11 wherein the first binding material comprises a vinyl tape.

20. The laminated strip of inlay material of claim 18 wherein the second binding material comprises a vinyl tape.

* * * * *